United States Patent
Ng et al.

(10) Patent No.: US 10,186,739 B2
(45) Date of Patent: Jan. 22, 2019

(54) BATTERY ASSEMBLY

(71) Applicant: Ampd Energy Limited, Hong Kong (CN)

(72) Inventors: Brandon Boon Soon Ng, Hong Kong (CN); Luciano Gurgel Valente, Hong Kong (CN); Kevin Chan, Hong Kong (CN)

(73) Assignee: Ampd Energy Limited, Hong Kong (CN)

( * ) Notice: Subject to any disclaimer, the term of this patent is extended or adjusted under 35 U.S.C. 154(b) by 405 days.

(21) Appl. No.: 15/117,732

(22) PCT Filed: Oct. 21, 2015

(86) PCT No.: PCT/CN2015/092426
§ 371 (c)(1),
(2) Date: Aug. 10, 2016

(87) PCT Pub. No.: WO2016/062250
PCT Pub. Date: Apr. 28, 2016

(65) Prior Publication Data
US 2017/0170447 A1    Jun. 15, 2017

Related U.S. Application Data

(60) Provisional application No. 62/067,450, filed on Oct. 23, 2014.

(51) Int. Cl.
*H05K 7/00*    (2006.01)
*H01M 10/667*    (2014.01)
(Continued)

(52) U.S. Cl.
CPC ........ *H01M 10/667* (2015.04); *H01M 2/022* (2013.01); *H01M 2/105* (2013.01);
(Continued)

(58) Field of Classification Search
CPC .. H01M 10/667; H01M 10/653; H01M 10/02; H01M 10/0422; H01M 2/022;
(Continued)

(56) References Cited

U.S. PATENT DOCUMENTS

| 4,411,970 | A  | 10/1983 | Meyer et al. |
| 7,602,145 | B2 | 10/2009 | Renda |

(Continued)

FOREIGN PATENT DOCUMENTS

| CN | 102195022 | 9/2011 |
| CN | 202259589 | 5/2012 |

(Continued)

OTHER PUBLICATIONS

B Wu et al, "Fault Analysis in Bettery Module Design for Electric and Hybrid Vehicles", 6th IET International Conference on Power Electronics, Machines and Drives, Mar. 29, 2012.
(Continued)

*Primary Examiner* — Hung S Bui
(74) *Attorney, Agent, or Firm* — Eagle IP Limited; Jacqueline C. Lui

(57) ABSTRACT

A battery assembly (100) includes a plurality of batteries (120). The battery assembly (100) includes a printed circuit board (148A, 148B) that attaches to a flat conductive sheet (200) with plural fuses (220). A plurality of cushions (460) compress between the batteries and the printed circuit board to force the conductive sheet into electrical contact with an end of the batteries.

17 Claims, 9 Drawing Sheets

(51) Int. Cl.
*H01M 2/10* (2006.01)
*H01M 2/20* (2006.01)
*H01M 10/653* (2014.01)
*H01M 2/02* (2006.01)
*H01M 10/02* (2006.01)
*H01M 10/04* (2006.01)
*H01M 2/34* (2006.01)

(52) U.S. Cl.
CPC ......... *H01M 2/1055* (2013.01); *H01M 2/204* (2013.01); *H01M 2/34* (2013.01); *H01M 10/02* (2013.01); *H01M 10/0422* (2013.01); *H01M 10/653* (2015.04); *H01M 2200/103* (2013.01); *H01M 2220/30* (2013.01)

(58) Field of Classification Search
CPC .... H01M 2/105; H01M 2/1055; H01M 2/204; H01M 2/34; H01M 2200/103; H01M 2200/30
USPC ......................................................... 361/729
See application file for complete search history.

(56) References Cited

U.S. PATENT DOCUMENTS

| | | | |
|---|---|---|---|
| 7,671,565 B2 | 3/2010 | Straubel et al. | |
| 8,133,287 B2 | 3/2012 | Hermann et al. | |
| 8,361,646 B2 | 1/2013 | Ferber, Jr. | |
| 8,785,028 B1 | 7/2014 | Saiki | |
| 8,932,741 B2 | 1/2015 | Eberhard et al. | |
| 9,065,103 B2 | 6/2015 | Straubel et al. | |
| 9,559,394 B2 * | 1/2017 | Eckl | H01M 2/1077 |
| 9,768,425 B2 * | 9/2017 | Geshi | H01M 2/206 |
| 9,812,694 B2 * | 11/2017 | Takano | H01M 2/34 |
| 2006/0177734 A1 * | 8/2006 | Yao | H01M 2/202 |
| | | | 429/160 |
| 2008/0131764 A1 | 6/2008 | Saiki | |
| 2011/0250487 A1 | 10/2011 | Nakashima | |
| 2013/0202941 A1 | 8/2013 | Ono et al. | |
| 2015/0244047 A1 | 8/2015 | Straubel et al. | |

FOREIGN PATENT DOCUMENTS

| | | |
|---|---|---|
| CN | 202384422 | 8/2012 |
| CN | 102696131 | 9/2012 |
| CN | 203746959 | 7/2014 |
| CN | 104752639 | 7/2015 |
| EP | 2416405 | 12/2012 |
| WO | WO01/69699 | 9/2001 |
| WO | 2008050953 A1 | 5/2008 |
| WO | WO2014/016393 | 1/2014 |

OTHER PUBLICATIONS

Gregory J. Offer et al, "Module Design and Fault Diagnosis in Electric Vehicle Batteries", Journal of Power Sources, vol. 206, Jan. 21, 2012, pp. 383-392.

* cited by examiner

BATTERY ASSEMBLY

FIELD OF THE INVENTION

The present invention relates to a battery assembly that includes a plurality of batteries positioned between two printed circuit boards, two conductive sheets with fuses, and elastomeric pads.

BACKGROUND ART

Electronic devices often require power from a portable power supply. These power supplies can include rechargeable lithium-ion batteries that are arranged in an assembly or pack. The batteries are arranged in series or in parallel to obtain a desired capacity or voltage.

In view of the demand for portable power, improvements in battery assemblies and power components are desired.

SUMMARY OF THE INVENTION

One example embodiment is a battery assembly that includes a plurality of batteries. The battery assembly includes a printed circuit board that attaches to a flat conductive sheet with plural fuses. A plurality of cushions compress between the batteries and the printed circuit board to force the conductive sheet into electrical contact with an end of the batteries.

Other example embodiments are discussed herein.

DETAILED DESCRIPTION OF EMBODIMENTS

Figure 1A:
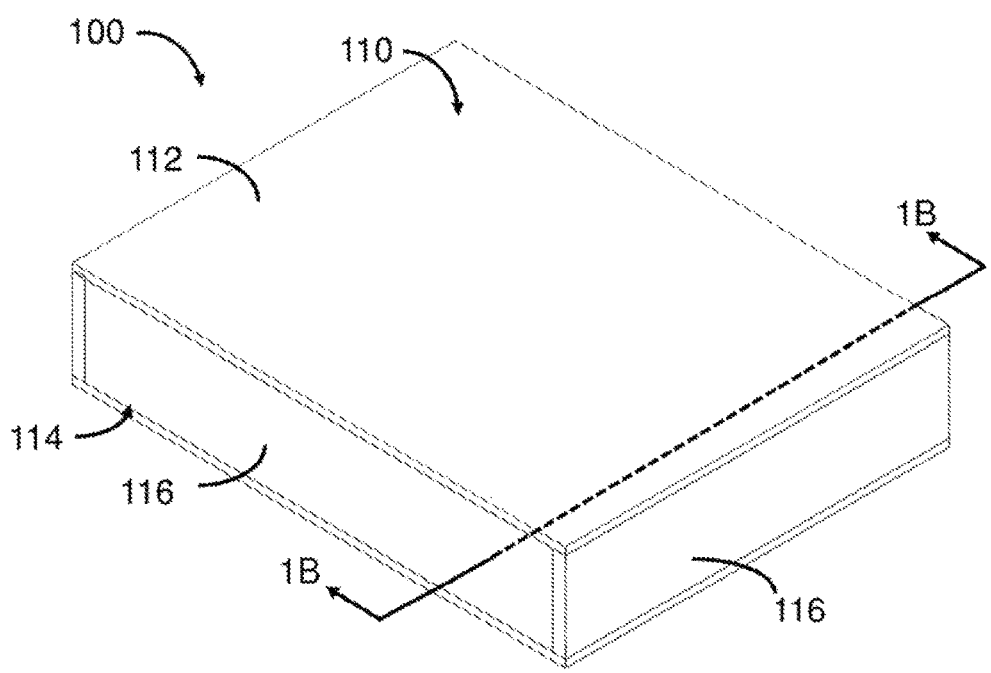
FIG. 1A shows a battery assembly in accordance with an example embodiment.

Example embodiments relate to apparatus and methods that provide a rechargeable power supply that includes one or more rechargeable batteries. The batteries are housed in a module or an assembly that is portable.

An example embodiment includes a battery assembly with a plurality of batteries that are individually fused and interconnected through a conductive structure. The conductive structure includes deformable and spring-supported flat conductive sheets that electrically connect batteries in parallel and/or series.

In one embodiment for example, the batteries are housed or sandwiched between two printed circuit boards (PCBs) that electrically connect to the conductive sheets. Elastomeric pads, cushions, or springs are located between a PCB and a respective terminal or end of a battery. The pads push against or bias the conductive sheets such that the fuses bend or deform and position the conductive contacts out of a planar view of the conductive sheets. In this position, the conductive contacts abut or engage the terminals of the batteries and provide support to the assembly and electrical contact between the batteries and PCBs.

In an example embodiment, the conductive sheets are fabricated from one or more sheets of conductive material in which material is removed from the sheets to provide a shape and size of conductors and fuses for the batteries. For instance, material is removed, etched, or stamped out from a sheet to generate a plurality of conductive contacts. Alternatively, the conductive sheets are made without needed material, such as fabricating the conductive sheet with holes or spaces at the fuse cells (e.g., holes or spaces adjacent to the conductive contacts of a fuse cell).

Each conductive contact has two legs formed as thin wires. These legs are dimensioned to allow for an expected current to pass through them without significant heat being generated during normal operation of the battery assembly. In the event of an overcurrent situation, the wires burn, melt, or break and electrically disconnect.

The wires of a fuse are dimensioned to be economically producible with sufficient strength to not break during normal or expected usage of the battery assembly. Further, the wires can be curved, such as having an S-shape or other curved configuration, to provide a compact design that meets the fusing requirements of the battery assembly and/or individual batteries.

In an example embodiment, the conductive contacts and fuses are integrally formed in a sheet of material with a linear shape or matrix shape, such as being formed in a sheet having a single row or formed in a sheet having a plurality of rows and columns of conductive contacts and fuses. For example, the fuses are formed into or from the sheet when the sheet is processed (such as the fuses or fuse cells being formed when the sheet is stamped, etched, processed to remove material, or processed to form the fuse cells and/or fuses). Alternatively, the fuses and/or fuse cells are not integrally formed in the sheet (such as being formed as one or more separate units and then attached to the sheet).

FIG. 1A shows a battery pack or battery assembly 100 enclosed in a housing 110 with a rectangular shape. The housing 110 includes a top cover or lid 112, a bottom cover or lid 114, and a plurality of side covers 116 that house, enclose, and/or protect components of the battery assembly. The housing provides the battery assembly with a form factor such that two or more assemblies can be stacked, electrically connected, and transported together.

Figure 1B:
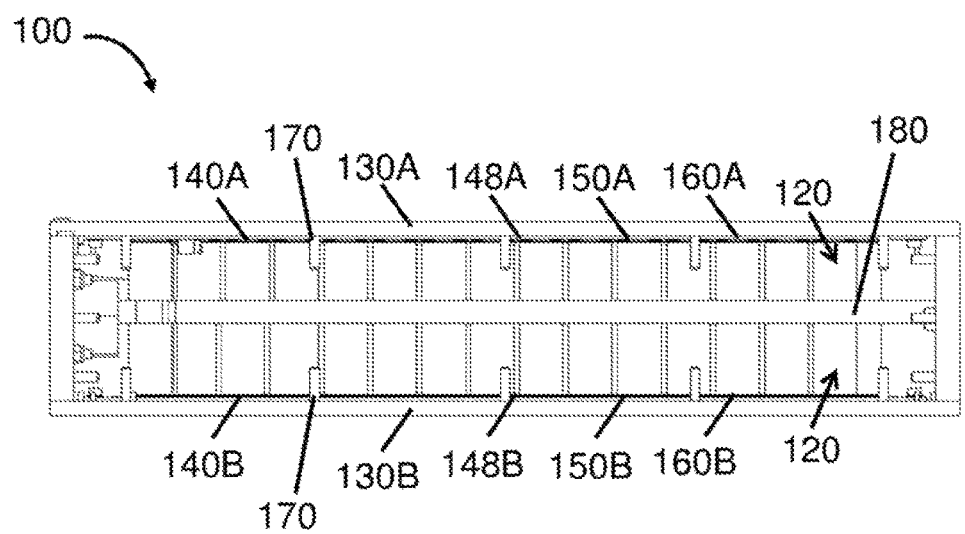
FIG. 1B shows a cut-away view of the battery assembly of FIG. 1A in accordance with an example embodiment.

FIG. 1B shows the battery assembly 100 with the side covers removed. The battery assembly 100 includes a plurality of batteries 120 positioned or sandwiched between a top cover or lid 130A and a bottom cover or base 130B. Each battery has a first end or terminal 140A and a second end or terminal 140B. The first end 140A electrically contacts or abuts a top or first conductive sheet 150A, and the second end 140B electrically contacts or abuts a bottom or second conductive sheet 150B (an example conductive sheet more fully shown in FIG. 2). As discussed and shown in more detail herein, a top or first PCB 148A is sandwiched between the top cover 130A and the top conductive sheet 150A. A bottom or second PCB 148B is sandwiched between the bottom cover 130B and the bottom conductive sheet 150B. A plurality of top or first elastomeric pads or cushions 160A force or bias the first conductive sheet 150A against the first end 140A, and a plurality of bottom or second elastomeric pads or cushions 160B force or bias the second conductive sheet 150B against the second end 140B (this configuration more fully shown in FIG. 6).

As shown in FIG. 1B, the top cover 130A and bottom cover 130B include a plurality of posts or dowels or pins 170 that extend outwardly from the covers to position and align the PCBs and the conductive sheets to terminals of the batteries.

Figure 5:
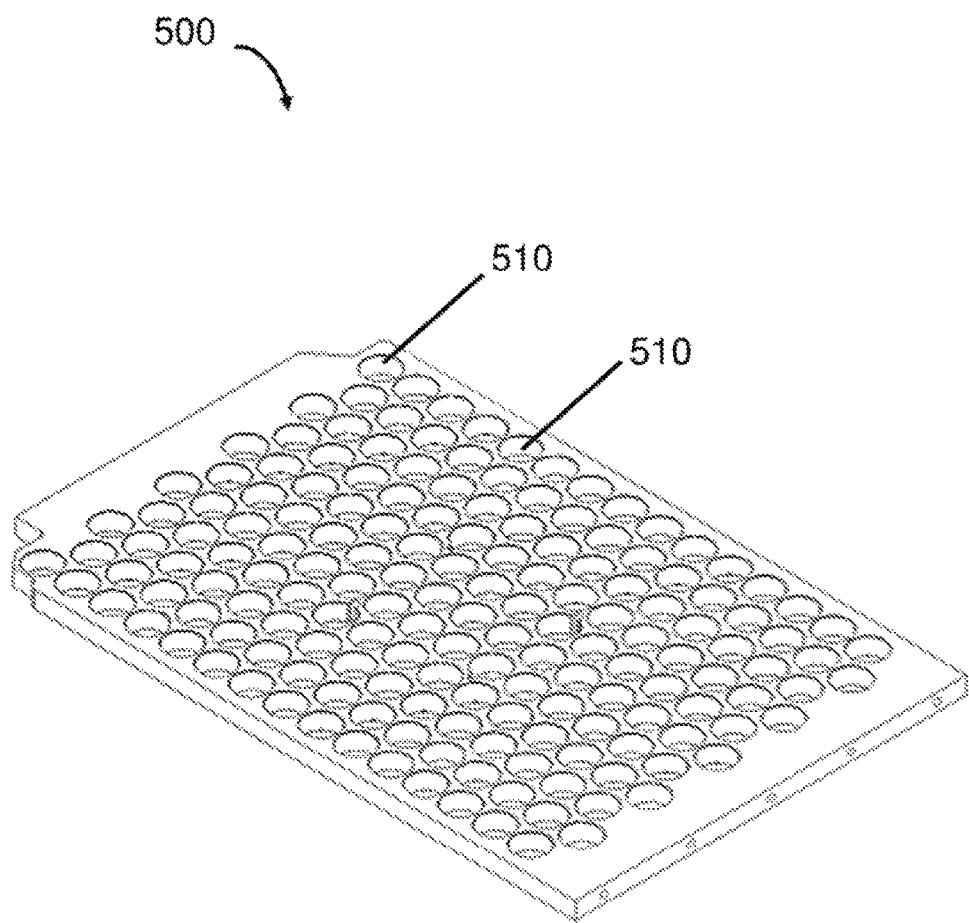
FIG. 5 shows a support structure of a battery assembly in accordance with an example embodiment.

The battery assembly also includes a support structure 180 that supports and aligns the batteries 120 in the battery assembly (the support structure more fully shown in FIG. 5).

As shown in FIG. 1B and with reference to FIG. 1A, the batteries are stacked, positioned, or arranged in a side-by-side relationship and arranged in a matrix-shape or grid-structure such that each of the batteries is in electrical contact with a fuse of a first conductive sheet at a first terminal end and with another fuse of a second conductive sheet at a second terminal end. In this configuration, the batteries can be connected in series, parallel, or a combination of both and can be individually fused via the conductive sheets.

Figure 2:
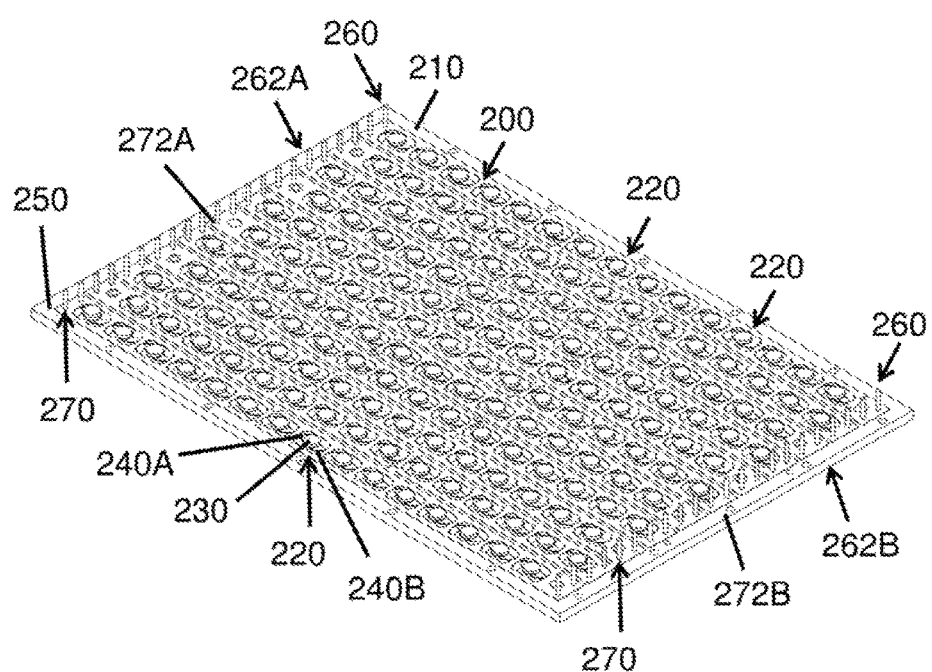
FIG. 2 shows a flat conductive sheet connected to a jig in accordance with an example embodiment.

FIG. 2 shows a flat conductive sheet 200 connected to a jig or fixture 210 in accordance with an example embodiment. The conductive sheet 200 includes a plurality of fuse cells or fuses 220 arranged in grid or matrix shape. For illustration, the conductive sheet 200 includes an array of fuse cells arranged in an eleven by fifteen (11×15) matrix such that the array has eleven (11) columns and fifteen (15) rows.

The fuse cells can be arranged in different patterns or geometries. As one example, the fuse cells are arranged in an N×M matrix wherein N and M are integers greater than or equal to one (1). As another example, the fuse cells are arranged in a linear array, such as arranging a plurality of fuse cells side-by-side along a straight or curved path.

Each fuse cell 220 includes a conductive contact 230 and two legs or wires 240A and 240B that connect to and extend outwardly from the conductive contact. In an example embodiment, the legs 240A and 240B are oppositely disposed from each other and have a straight and/or curved configuration.

As shown in FIG. 2, the jig 210 includes a flat surface 250 with a plurality of posts, dowels, or pins 260 arranged along two oppositely disposed ends 262A and 262B of the jig 210. The conductive sheet includes a plurality of holes 270 arranged along two oppositely disposed ends 272A and 272B. The posts 260 align with and extend through the holes 270 so that the flat surface 250 of the jig 210 seats against, abuts, or is proximate to a flat surface of the conductive sheet 200.

Figure 3:
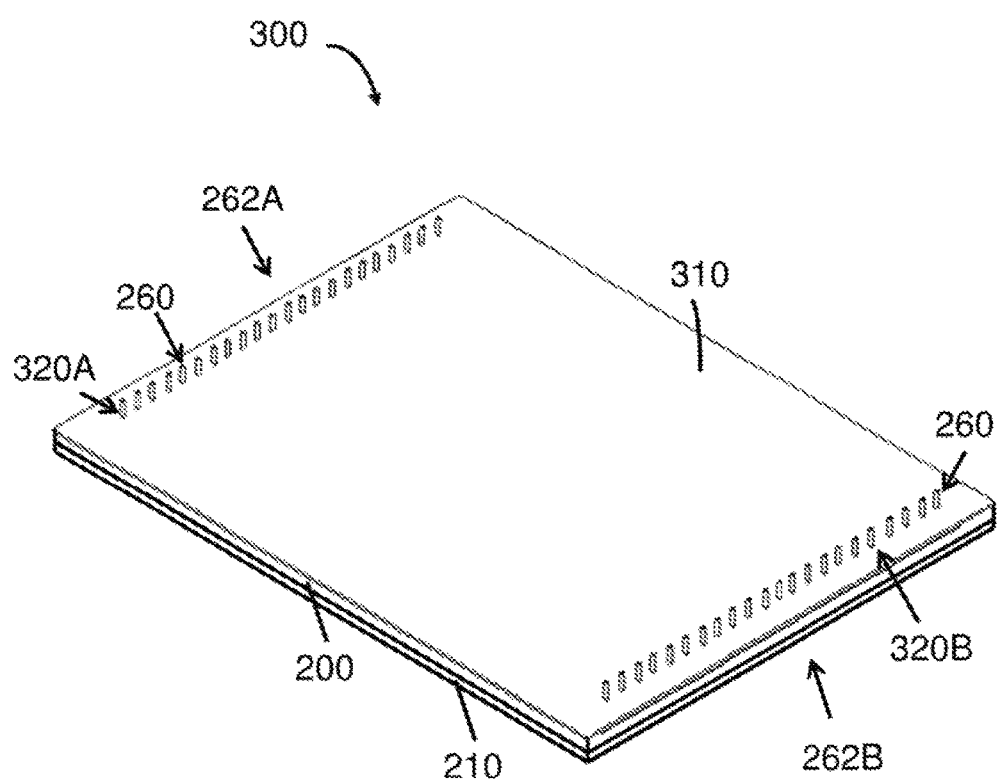
FIG. 3 shows a printed circuit board assembly of a battery assembly in accordance with an example embodiment.

FIG. 3 shows a PCB assembly 300 that is formed by placing a PCB 310 on top of or over the jig 210 and conductive sheet 200 shown in FIG. 2. As shown in FIG. 3, the PCB assembly 300 includes the PCB 310 positioned over the conductive sheet 200 such that the conductive sheet is sandwiched between the PCB 310 and the jig 210. The PCB 310 includes a plurality of holes 320A along one end and a plurality of holes 320B along an opposite end. These holes align with the pins 260 of the jig 210. In this configuration, the PCB 310 and the conductive sheet 200 are permanently connected together, such as with a series of solder points. Once the PCB and conductive sheet are connected, the jig 210 is removed.

Figure 4:
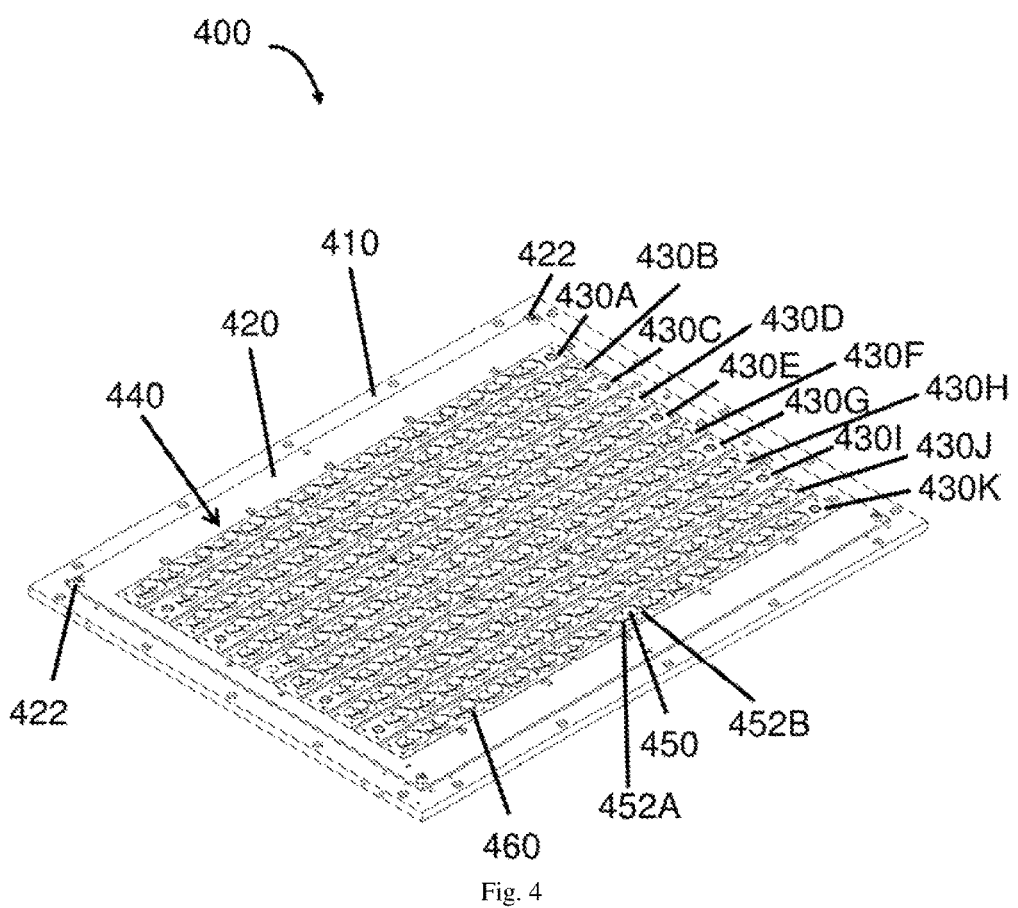
FIG. 4 shows a cover assembly of a battery assembly in accordance with an example embodiment.

FIG. 4 shows a cover assembly 400 of a battery assembly in accordance with an example embodiment. The cover assembly 400 includes a lid or cover 410 connected to a PCB 420 through fasteners 422 located in corners of the cover and PCB. A plurality of conductive sheets 430A-430K are permanently connected to the PCB 420. For illustration, each conductive sheet 430A-430K includes fifteen (15) fuse cells 440 with each fuse cell having a conductive contact 450 and fuse legs or wires 452A and 452B.

An elastomeric pad or cushion 460 is positioned behind each fuse cell such that the cushion is sandwiched between the PCB 420 and a fuse cell. The cushions 460 have a round or circular shape in a plan view and a cylindrical shape in a perspective view. The cushions can have other shapes as well, such as square, rectangular, polygonal, etc.

In an example embodiment, each cushion has a size and shape that emulate a size and shape of a conductive contact of a fuse cell. FIG. 4, for example, shows that the cushions 460 have a cylindrical shape, and the conductive contacts 450 have a round or circular shape. The cushions 460 are positioned against or adjacent the PCB 420 and bias, push, or force the conductive contacts 450 outwardly or away from the PCB 420.

FIG. 5 shows a support structure 500 of a battery assembly in accordance with an example embodiment. The support structure 500 includes a plurality of spaced holes 510 arranged in a grid, lattice, or matrix shape. The holes are sized and shaped to receive the batteries of the battery assembly. For example, a diameter of a hole corresponds with or is slightly larger than a diameter of a battery that fits into or through a hole. For instance, a lattice of holes are spaced apart such that each hole encircles a mid-section of a battery such that the support structure maintains the batteries in stable vertical orientation with respect to each other (for example, see FIG. 1B showing the batteries arranged in a vertical orientation).

Figure 6:
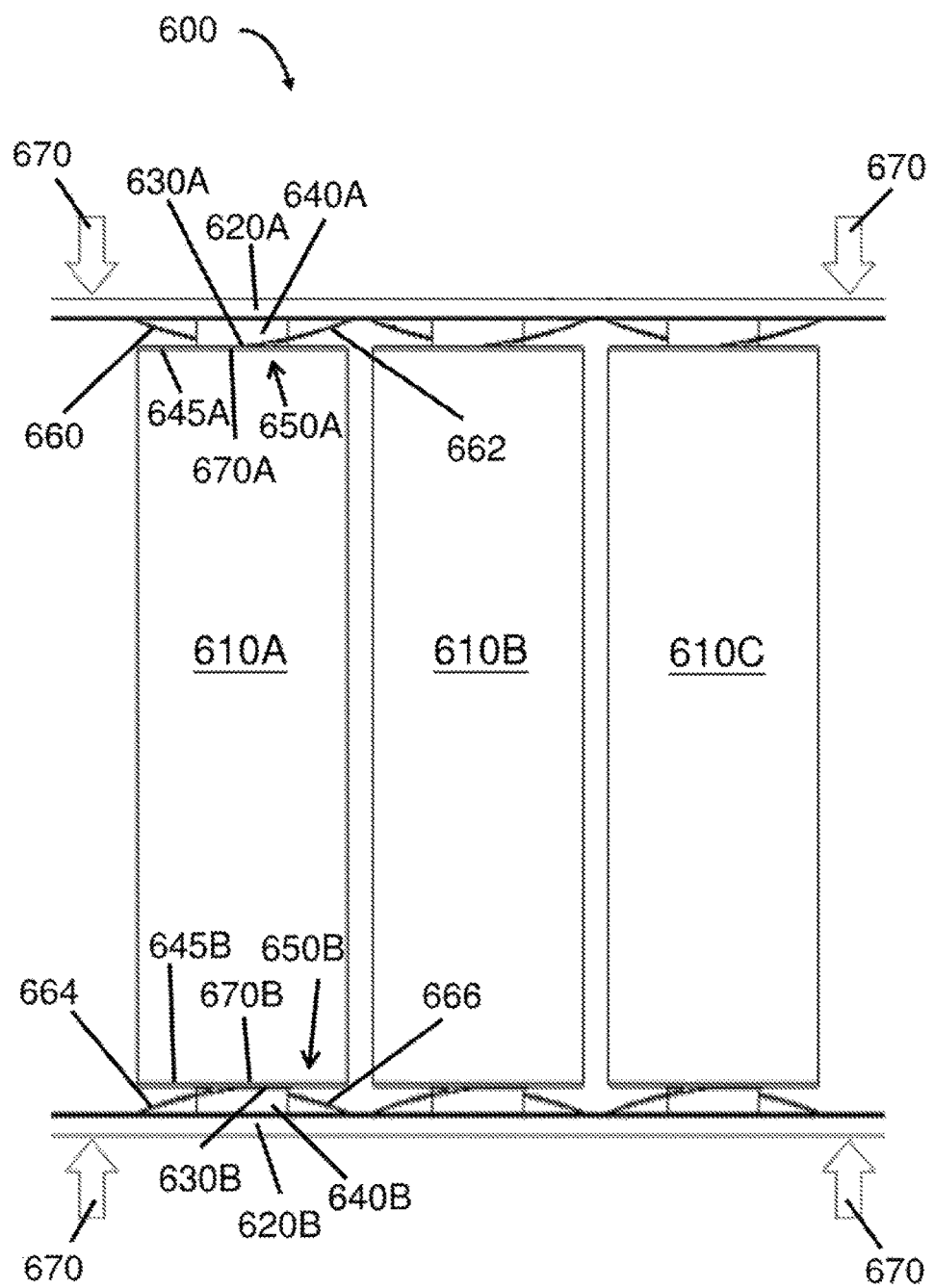
FIG. 6 shows a partial view of a battery assembly in which a plurality of batteries are positioned between two printed circuit boards, two conductive sheets, and two elastomeric pads in accordance with an example embodiment.

FIG. 6 shows a partial view of a battery assembly 600 in which a plurality of batteries 610A-610C are positioned between two printed circuit boards 620A and 620B, two conductive sheets 630A and 630B, and two elastomeric pads or cushions 640A and 640B in accordance with an example embodiment (the pads being labeled for battery 610A).

As shown for battery 610A, pad 640A is seated between the PCB 620A and the conductive sheet 630A. In this configuration, the pads biases, pushes, or forces the conductive sheet into electrical contact with an end or terminal 645A of battery 610A. For example, pad 640A engages fuse cell 650A, deforms or bends wires or legs 660 and 662 such that conductive contact 670A moves out of plane as seen from a side-view to abut or to engage the end or terminal 645A of the battery 610A.

As shown for battery 610A, pad 640B is seated between the PCB 620B and the conductive sheet 630B. In this configuration, the pad biases, pushes, or forces the conductive sheet into electrical contact with an end or terminal 645B of battery 610B. For example, pad 640B engages fuse cell 650B, deforms or bends wires or legs 664 and 666 such that conductive contact 670B moves out of plane to abut or to engage the end or terminal 645B of the battery 610A.

Arrows 670 show a force being applied to PCB 620A and PCB 620B from a housing or enclosure (e.g., see FIG. 1). In this configuration, the batteries 610A-610C are lodged or supported inside of the battery assembly.

An elastomeric pad, cushion, or spring can be made from a variety of materials including, but not limited to, compressible silicone foam, non-conductive spring (such as a plastic spring or a spring made from non-conductive metal), rubber, or a polymer (such as a polyurethane elastomeric alloy).

Figure 7A:
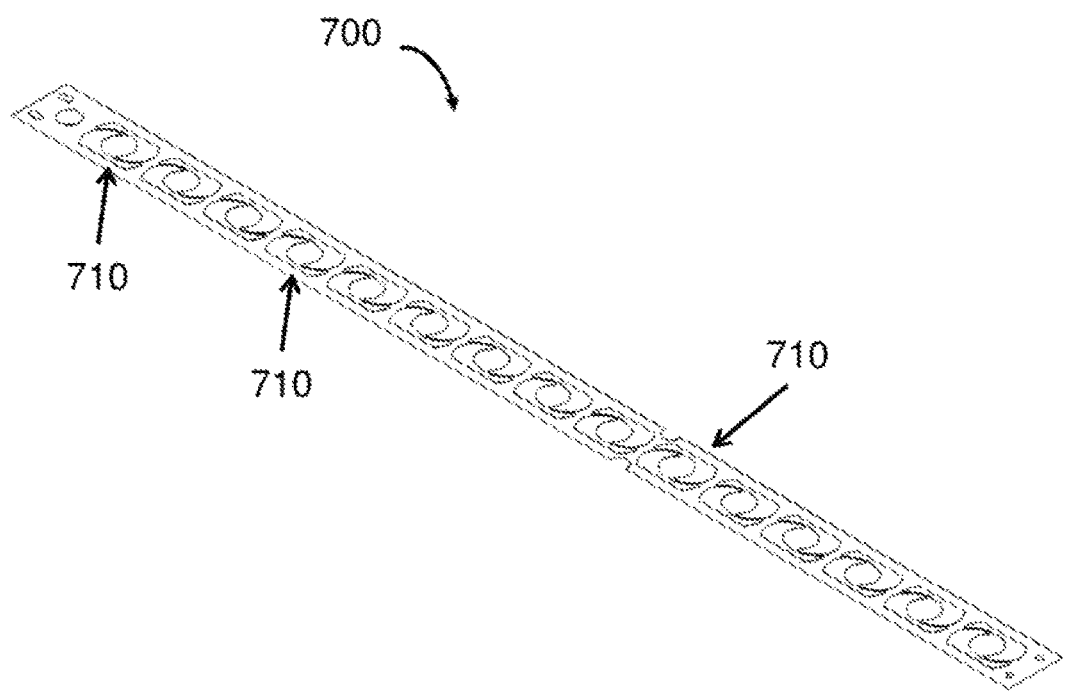
FIG. 7A shows a conductive sheet formed as a linear strip of fuse cells with integrated fuses in accordance with an example embodiment.
Figure 7B:
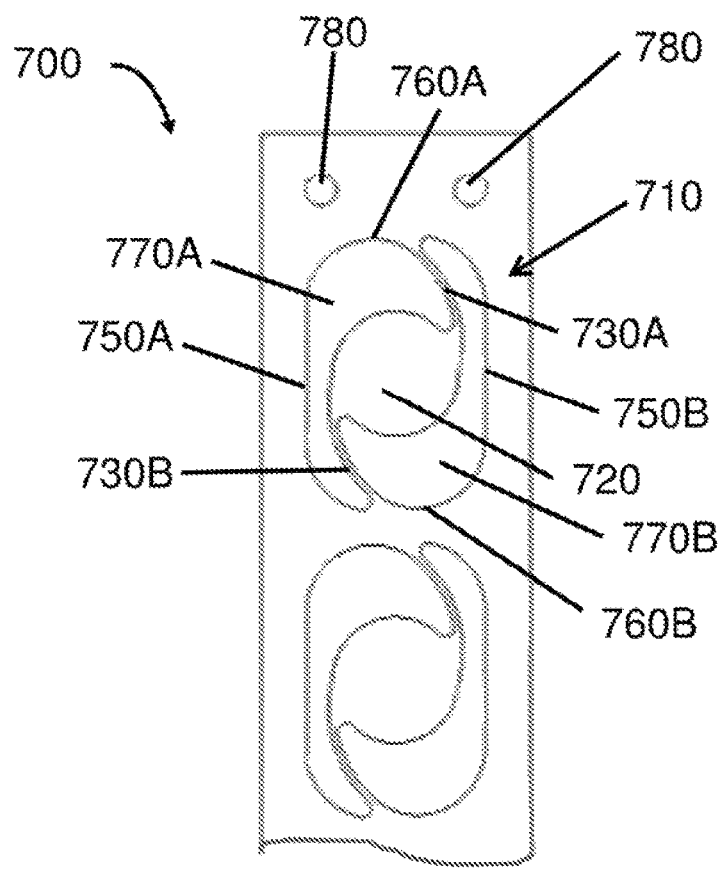
FIG. 7B shows a portion of the conductive sheet with integrated fuses of FIG. 7A in accordance with an example embodiment.

FIG. 7A shows a conductive sheet 700 formed as linear strip of fuse cells 710 with integrated fuses in accordance with an example embodiment. FIG. 7B shows a portion of the conductive sheet 700 with integrated fuses of FIG. 7A in accordance with an example embodiment.

As shown in FIGS. 7A and 7B, each fuse cell 710 includes a conductive contact 720 and two legs or wires 730A and 730B. A conductive portion of the fuse cell has an S-shape with leg 730A being a top curved leg and leg 730B being a bottom curved leg. These legs extend outwardly from opposite ends of a body of the conductive contact 720.

As best shown in FIG. 7B, each fuse cell 710 has a general oval or rectangular shape with two straight sides 750A and 750B and two round or curved ends 760A and 760B. Material from the conductive sheet 700 is removed at locations 770A and 770B to integrally form the fuse cell into the conductive sheet. Ends of the conductive sheet are provided with holes 780 that enable the conductive sheet to be attached to the PCB or another object in the battery assembly.

The fuse cells and elastomeric cushions or pads can have different shapes and sizes. For example, the conductive contact and elastomeric cushions or pads can have a round or circular shape, a rectangular shape, a square shape, a polygonal shape, or another shape with rounded or curved ends or sides.

Each fuse cells acts as a fuse for an individual battery. A combined current carrying capacity of the integrated fuses is higher than an expected current from a single battery. When the current from a battery exceeds the current carrying capacity of the integrated fuses, the integrated fuses for that battery will break or blow and electrically disconnect or isolate the battery from the conductive sheet.

It will be appreciated that numerous methods can be used to alter a current carrying capacity of the fuses (such current carrying capacity being a function of resistance and a rate of heat dissipation). For example, a short fuse with a large cross-sectional area will be able to carry a larger electrical current than a long fuse with a small cross-sectional area.

Figure 8:
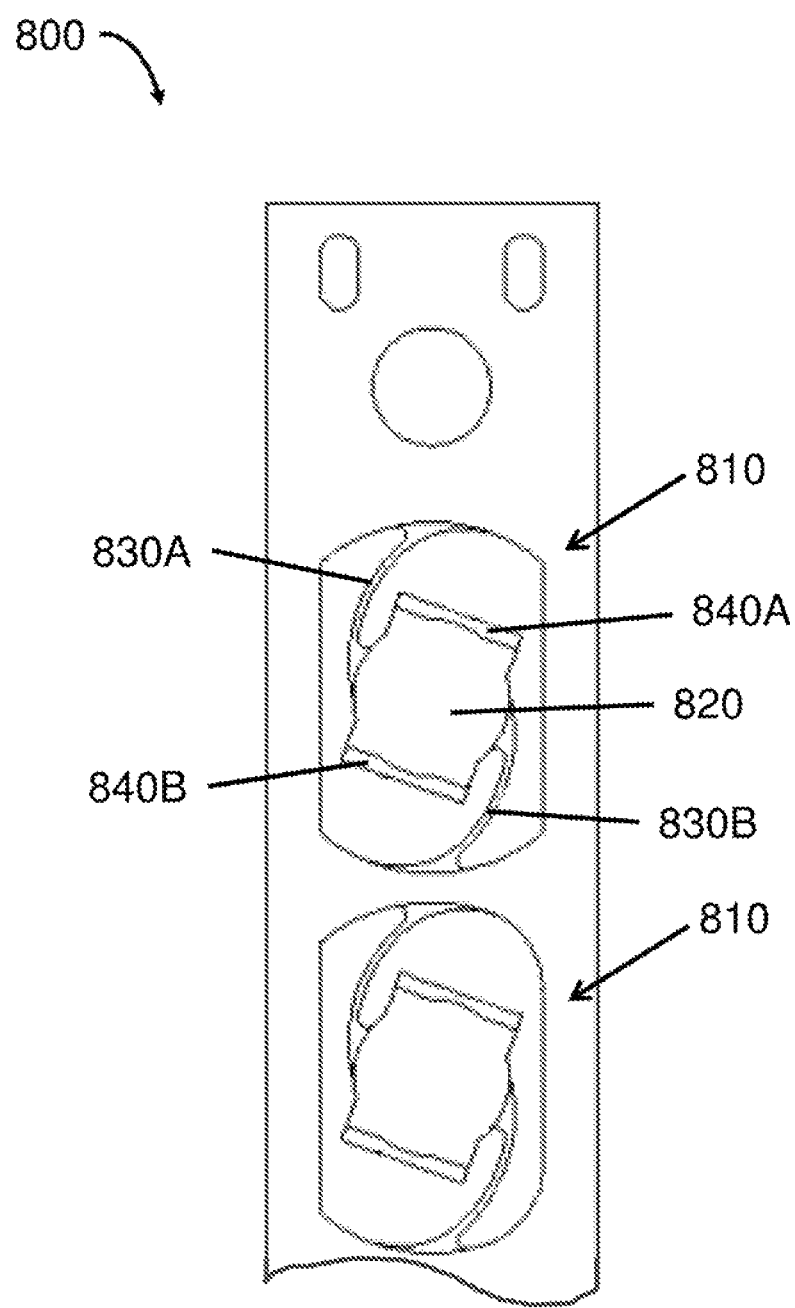
FIG. 8 shows another embodiment of a conductive sheet with a linear strip of fuse cells with integrated fuses in accordance with an example embodiment.

FIG. 8 shows another embodiment of a conductive sheet 800 with a linear array of fuses or fuse cells 810 with a plurality of integrated fuses attached together in accordance with an example embodiment. Each fuse or fuse cell 810 includes a conductive contact 820 and two legs or wires 830A and 830B. A conductive portion of the fuse cell has curved-shape or an S-shape with leg 830A being a top curved leg and leg 830B being a bottom curved leg. These legs extend outwardly from opposite ends of a body of the conductive contact 820.

The conductive contact 820 includes two oppositely disposed ends 840A and 840B that include thermal conductive structures. These thermal conductive structures remain electrically isolated from electrical conduction pathways on the PCB while current flows through the fuse cell. The thermal conductive structures cool the fuse cell as heat is dissipated away from the fuse cell. For example, the conductive contact 820 provides a structure or mechanism that transfers heat generated by the battery to the conductive sheet and ultimately to the PCB or another heat sink.

By way of example, the thermal conductive structures attach or engage a PCB. Heat generated from the batteries passes to the conductive contacts, along the thermal conductive structures, and to the PCB. In this manner, the PCB functions as a heat sink for the batteries. Heat is thus dissipated away from the batteries and conductive sheets to the PCBs.

In one example embodiment, the thermal conductive structures are formed as bends, curves, or angled pieces of ends of the conductive contacts. For instance, oppositely disposed ends of the conductive contact 820 bend or taper downwardly or out-of-plane with the conductive contact. These ends (shown as the thermal conductive structures 840A and 840B) engage or contact the PCB when the conductive sheets are soldered to the PCB.

Figure 9:
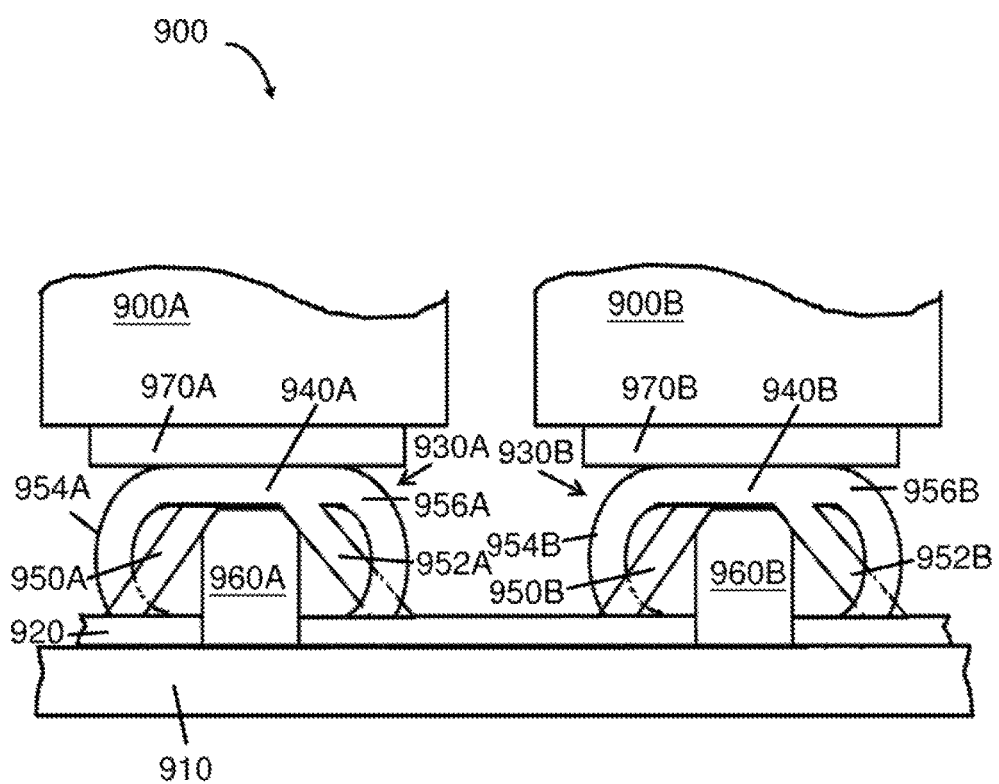
FIG. 9 shows two batteries connected to a printed circuit board in accordance with an example embodiment.

FIG. 9 shows two batteries 900A and 900B connected to a printed circuit board 910 in accordance with an example embodiment. The printed circuit board 910 electrically connects to a conductive sheet 920 that includes two fuses or fuse cells 930A and 930B with a configuration shown in FIG. 8.

Each fuse cells 930A and 930B shown in FIG. 9 includes a conductive contact (shown as 940A and 940B) and two legs (shown as 950A, 952A, 950B, and 952B). Ends of the conductive contacts include a thermal conductive structure (shown as 954A, 956A, 954B, and 956B). An elastomeric pad or cushion 960A is positioned between the conductive contact 940A and the PCB 910, and elastomeric pad or cushion 960B is positioned between the conductive contact 940B and the PCB 910. These elastomeric pads compress and push against the conductive contacts and deform a shape of the fuse cell. A force against the fuse cell causes the conductive contact to move out of plane with the conductive sheet. FIG. 9 shows conductive contacts 940A and 940B pushed above the conductive sheet 920 (FIG. 9 showing an exaggerated view for illustration).

When the conductive contacts 940A and 940B are moved out of plane with respect to a body of the conductive sheet, they engage an electrical contact or terminal (shown as 970A and 970B) for batteries 900A and 900B. In this configuration, the elastomeric pads compress and assist in supporting the batteries in the battery assembly and providing electrical contact between the batteries and the conductive sheet and/or PCB.

As used herein, a "battery assembly" is an assembly of two or more batteries or batteries cells that are configured in series, parallel, or a mixture of both to deliver a desired voltage, capacity, or power density.

As used herein, a "conductor" is an object or type of material that allows the flow of electricity. Examples of a conductive material include, but are not limited to, copper, silver, gold, aluminum, zinc, nickel, brass, and other conductive material (such as other metals, graphite, polymers, and semiconductors).

As used herein, a "fuse" is a low resistant resistor that melts, breaks, or "blows" when a current exceeds a safe level. Fuses provide overcurrent protection to a load, circuit, and/or electrical component.

As used herein, "integrally formed" means formed with material common to the rest of the unit and the connection having no mechanical joints. Integrally is distinguished from two-piece or multi-piece construction in which separate pieces are connected together.

As used herein, a "printed circuit board" or "PCB" is a structure that mechanically and electrically connects electronic components using conductive tracks, pads, or pathways. PCBs can be single sided, double sided, and multilayered.

As used herein, a "rechargeable battery" is a battery that can be charged, discharged into a load, and recharged more than once. Rechargeable batteries can be produced with different sizes and shapes and different combinations of electrode materials and electrolyte including, but not limited to, lithium ion, lithium ion polymer, nickel metal hydride, lead-acid, and nickel cadmium.

What is claimed is:

1. A battery assembly, comprising:
   a first printed circuit board (PCB);
   a second PCB oppositely disposed from the first PCB;
   first and second conductive sheets each with a plurality of fuses integrally formed in the conductive sheets and arranged in a matrix-shape;
   a plurality of batteries each having a first end electrically connected with the first PCB and a second end electrically connected with the second PCB;
   a plurality of first elastomeric pads positioned between the first PCB and the first conductive sheet to deform the first conductive sheet to electrically contact the first end of the batteries; and
   a plurality of second elastomeric pads positioned between the second PCB and the second conductive sheet to deform the second conductive sheet to electrically contact the second end of the batteries,
   wherein each of the fuses includes two legs and a conductive contact located between the two legs such that the two legs bend outwardly from a side-view of the first and second conductive sheets and abut terminals of the batteries located at the first and second ends of the batteries.

2. The battery assembly of claim 1, wherein the fuses have an S-shape that include a first curved leg, a second curved leg, and a round conductive contact located between the first and second curved legs.

3. The battery assembly of claim 1, wherein the first and second conductive plates are a flat sheet of conductive material with the fuses arranged in the matrix-shape with an N×M configuration, with N and M being integers greater than or equal to 1.

4. The battery assembly of claim 1 further comprising a support structure with a plurality of holes arranged in the matrix-shape and positioned between the first and second ends of the batteries such that each of the batteries fits through one of the holes and aligns with one of the fuses in the first and second conductive sheets.

5. The battery assembly of claim 1, wherein the batteries are stacked between the first and second PCBs in a side-by-side relationship and arranged in the matrix-shape such that each of the batteries is in electrical contact with one of the fuses of the first conductive sheet at a first terminal end and with one of the fuses of the second conductive sheet at a second terminal end.

6. The battery assembly of claim 1, wherein the batteries are electrically connected to each other in parallel and are individually fused via the first and second conductive sheets.

7. A battery assembly, comprising:
   a first printed circuit board (PCB) having a flat side;
   a first conductive sheet positioned against the flat side of the first PCB and including a plurality of linearly arranged fuses formed in the first conductive sheet and in electrical contact with the first PCB;
   a second PCB having a flat side;
   a second conductive sheet positioned against the flat side of the second PCB and including a plurality of linearly arranged fuses formed in the second conductive sheet and in electrical contact with the second PCB;
   a plurality of batteries located between the first PCB and the second PCB with each of the batteries including a first terminal in electrical contact with the first conductive sheet and a second terminal in electrical contact with the second conductive sheet;
   a plurality of first springs located between the flat side of the first PCB and the first conductive sheet and positioned to deform the first conductive sheet into electrical contact with the first terminal of the batteries; and
   a plurality of second springs located between the flat side of the second PCB and the second conductive sheet and positioned to deform the second conductive sheet into electrical contact with the second terminal of the batteries,
   wherein the fuses include a conductive contact, two legs that extend outwardly from the conductive contact and function as fuses, and two ends that extend outwardly from the conductive contact and function to transfer heat to the first and second PCBs.

8. The battery assembly of claim 7, wherein each of the first and second PCBs includes two oppositely disposed ends with each of the ends having a plurality of dowels arranged in a straight row along a perimeter of the ends, and wherein each of the first and second conductive sheets includes two oppositely disposed ends with each of the ends having holes that align with and receive the plurality of dowels.

9. The battery assembly of claim 7, wherein the fuses are formed into a conductive metal sheet such that each fuse includes a circular conductive contact and two curved legs extending outwardly from the circular conductive contact.

10. The battery assembly of claim 7, wherein the two legs extend outwardly from opposite ends of the conductive contact, and the two legs bend to move the conductive contact out of plane as seen from a side-view of the first and second conductive sheets.

11. The battery assembly of claim 7 further comprising a support structure with a lattice of holes that are spaced apart such that each hole encircles a mid-section of a battery and the support structure maintains the batteries in stable vertical orientation with respect to each other.

12. The battery assembly of claim 7, wherein material is removed from the first and second conductive sheets to form the fuses in a grid pattern in the first and second conductive sheets.

13. A battery assembly that houses a plurality of rechargeable batteries, comprising:
   a first printed circuit board (PCB);
   a first conductive sheet attached to one side of the first PCB and being formed as a flat first sheet with a plurality of fuses formed in the first sheet and arranged in a grid of rows and columns;
   a second PCB;
   a second conductive sheet attached to one side of the second PCB and being formed as a flat second sheet with a plurality of fuses formed in the second sheet and arranged in a grid of rows and columns;
   a plurality of first cushions compressed between the first PCB and the first conductive sheet to force the first conductive sheet into electrical contact with a first end of the rechargeable batteries; and
   a plurality of second cushions compressed between the second PCB and the second conductive sheet to force the second conductive sheet into electrical contact with a second end of the rechargeable batteries, wherein the fuses have an S-shape with a circular conductive contact and two oppositely disposed curved legs.

14. The battery assembly of claim 13, wherein the first and second cushions are shaped as a cylinder, the fuses are shaped with a circular conductive contact and two oppositely disposed legs, and the cylinder aligns with the circular conductive contact and pushes the circular conductive contact into electrical contact with the rechargeable batteries.

15. The battery assembly of claim 13, wherein each of the rechargeable batteries has a separate fuse and is removable from and replaceable into the battery assembly without removing other ones of the rechargeable batteries in the battery assembly.

16. The battery assembly of claim 13 further comprising a support structure with a plurality of holes arranged in a grid of rows and columns that match the grid of rows and columns of the first and second conductive sheets such that the holes of the support structure receive the rechargeable batteries and align the rechargeable batteries with the fuses.

17. The battery assembly of claim 13, wherein the curved legs are dimensioned to allow for an expected current to pass therethrough and being dimensioned to break and electrically disconnect.

* * * * *